United States Patent [19]

Grandchamp

[11] 4,158,234

[45] Jun. 12, 1979

[54] AUTOCORRELATION FUNCTION PARAMETER DETERMINATION

[75] Inventor: Pierre-André Grandchamp, Münchenstein, Switzerland

[73] Assignee: Hoffmann-La Roche Inc., Nutley, N.J.

[21] Appl. No.: 749,202

[22] Filed: Dec. 9, 1976

[30] Foreign Application Priority Data

Dec. 12, 1975 [CH] Switzerland ........................ 16146/75
Sep. 23, 1976 [CH] Switzerland ........................ 12075/76

[51] Int. Cl.[2] ........................ G06G 7/48; G01N 15/02

[52] U.S. Cl. .................................... 364/834; 356/336; 364/715; 364/807

[58] Field of Search .................. 235/181, 150.53, 184; 364/728, 819, 604, 715, 807, 834; 356/102

[56] References Cited

U.S. PATENT DOCUMENTS

| | | | |
|---|---|---|---|
| 3,700,876 | 10/1972 | Gray | 235/181 |
| 3,717,756 | 2/1973 | Stitt | 235/181 |
| 3,777,133 | 12/1973 | Beck et al. | 235/181 |
| 3,792,245 | 2/1974 | Hocker et al. | 235/181 |
| 3,842,252 | 10/1974 | Jakeman et al. | 364/728 |
| 3,983,379 | 9/1976 | Scott | 235/181 |
| 3,996,457 | 12/1976 | Gabriel | 235/184 |

OTHER PUBLICATIONS van Resandt: A Digital Autocorrelator for Quasi-Elastic Light Scattering Using a Minicomputer, Rev. of Scientific Instruments, vol. 45, No. 12, Dec. 1974, pp. 1507-1510.

*Primary Examiner*—Felix D. Gruber

*Attorney, Agent, or Firm*—Jon S. Saxe; Bernard S. Leon; Mark L. Hopkins

[57] ABSTRACT

Method and apparatus for processing signals in order to determine certain parameters of their autocorrelation function, the autocorrelation function being defined by the general formula $$\psi(\tau) = \lim_{\Delta t \to \infty} \frac{1}{\Delta t} \int_{t_o}^{t_o + \Delta t} V(t)\, V(t+\tau)\, dt.$$

The method and apparatus are applicable to determining the size of particles in Brownian motion by measurement based on analysis of fluctuations in the intensity of light diffused by the particles when they are illuminated by a ray of coherent light waves. The parameter(s) of interest is (are) determined in dependence on at least two double integrals $R_1$, $R_2$ having the general form $$R_1 = \frac{1}{\Delta t} \int_{t_o}^{t_o + \Delta t} \int_{\tau_a}^{\tau_b} V(t)\, V(t+\tau)\, dt\, d\tau$$

$$R_2 = \frac{1}{\Delta t} \int_{t_o}^{t_o + \Delta t} \int_{\tau_c}^{\tau_d} V(t)\, V(t+\tau)\, dt\, d\tau$$

where the values $\tau a$, $\tau b$, $\tau c$, $\tau d$ define the integration ranges in the delay-time $\tau$ region and where $\Delta t$ represents an integration range with respect to time from an initial instant $\tau_o$. Means are provided for forming signals representing the double integrals $R_1$ and $R_2$. A computer unit receives the signals and generates an output signal corresponding to the aforementioned parameter(s) of the autocorrelation function.

3 Claims, 14 Drawing Figures

AUTOCORRELATION FUNCTION PARAMETER DETERMINATION

BACKGROUND OF THE INVENTION

The invention relates to a method and device for determining parameters of an autocorrelation function of an input signal V(t), the autocorrelation function being defind by the general formula:

$$\psi(\tau) = \lim_{\Delta t \to \infty} \frac{1}{\Delta t} \int_{t_o}^{t_o + \Delta t} V(t)\, V(t + \tau)\, dt$$

and the form of the function $\Phi(\tau)$ being known. More particularly, the invention relates to the processing of electric or other signals in order to determine certain parameters of their autocorrelation function provided that the form of the function (e.g. an exponential form) is known in advance. The invention also relates to a device for performing the method and relates further to the application of the method and device to determining the size of particles in Brownian motion, e.g. particles suspended in a solvent, by a method of measurement based on analysis of fluctuations in the intensity of light diffused by the particles when they are illuminated by a ray of coherent light waves.

In the aforementioned method of determining the size of particles, it has already been proposed to determine the size of particles by a method in which an electric signal is derived corresponding to the fluctuations in the intensity of light diffused at a given angle, and the size of the particles is determined by analysis of the electric signal (B. Chu. Laser Light scattering, Annual Rev. Phys. Chem. 21 (1970) page 145 ff).

In order to analyze the electric signal it has already been proposed to use a wave analyzer to determine the size of the particles in dependence on the bandwidth of an average frequency spectrum of the electric signal. When a wave analyzer is used which operates on only one frequency at a time, by scanning, the aforementioned method has the serious disadvantage of requiring a good deal of time, so that not more than six or eight measurements can be made per day. If it is desired to reduce the measuring time by using a wave analyser which measures spectra over its entire width simultaneously, the disadvantage is that the apparatus becomes considerably more expensive, since such rapid analysers are complex and expensive.

In an improved method of analysing the electric signal, an autocorrelator for deriving a signal corresponding to the autocorrelation function of the electric signal is used together with a special computer connected to the autocorrelator output in order to derive a signal corresponding to the size of the particles by determining the time constant of the autocorrelation function, which is known to have a decreasing exponential form. This improved method can considerably reduce the measuring time compared with the method using a wave analyser, but it is still desirable to have a method and device which can determine the size of particles by less expensive and less bulky means. In this connection, it is noteworthy that commercial autocorrelators and special computers (for determining the time constant) are relatively expensive and bulky.

The previously-mentioned disadvantage, which was cited for a particlar case, i.e. in determining the time constant of an exponential autocorrelation function, also affects the determination of other parameters of an autocorrelation function having a known form, e.g. linear or a Gaussian curve. As a rule, therefore, it is desirable to have a method and a device which can determine such parameters while avoiding the disadvantages mentioned hereinbefore in the case where the parameter to be determined is a time constant.

SUMMARY OF THE INVENTION

An object of the invention, therefore, is to provide a method and device which, at a reduced price and using less bulky apparatus, can rapidly determine at least one parameter of an autocorrelation function having a known form.

The method according to the invention is characterized in that the parameter is determined in dependence on at least two double integrals $R_1$, $R_2$ having the general form:

$$R_1 = \frac{1}{\Delta t} \int_{t_o}^{t_o + \Delta t} \int_{\tau_a}^{\tau_b} V(t)\, V(t + \tau)\, dt\, d\tau$$

$$R_2 = \frac{1}{\Delta t} \int_{t_o}^{t_o + \Delta t} \int_{\tau_c}^{\tau_d} V(t)\, V(t + \tau)\, dt\, d\tau$$

where the values $\tau a$, $\tau b$, $\tau c$, $\tau d$ define the integration ranges in the delay-time $\tau$ and where $\Delta t$ represents an integration range with respect to time from an initial instant $t_o$.

The invention also relates to a device for performing the method according to the invention, the device being characterized in that it comprises means for forming signals representing double integrals $R_1$ and $R_2$ and a computer unit which receives the aforementioned signals at its input so as to generate an output signal corresponding to the aforementioned parameter of the autocorrelation function.

The invention also relates to use of the method and/or of the device according to the invention in a device for determining the size of particles in Brownian motion in suspension in a solvent by analyzing the fluctuations in the intensity of light diffused by the particles when illuminated by a ray of coherent light waves and/or for detecting changes in the size of the aforementioned particles with respect to time.

BRIEF DESCRIPTION OF THE DRAWINGS

The invention will be more clearly understood from the following detailed description and accompanying drawings which, by way of non-limitating example, show a number of embodiments.

In the drawings.

DESCRIPTION OF THE PREFERRED EMBODIMENTS

Figure 1:
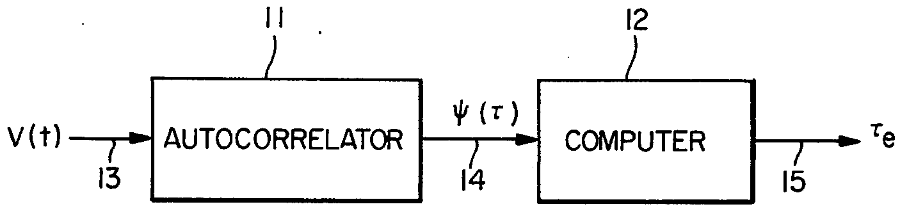
FIG. 1 is a symbolic block diagram of a known device for determining the time constant of an exponential autocorrelation function of a stochastic signal V(t)

Let V(t) be a stochastic signal equivalent to the signal obtained at the output of an RC low-pass filter when the signal produced by a white noise source is applied to its input. The aforementioned signal V(t) has an exponential autocorrelation function of the form:

$$\psi(\tau) = \psi_o e^{-\frac{|\tau|}{\tau_e}} \quad (1)$$

In order to determine the time constant $\tau_e$ of an exponential autocorrelation function such as (1) it has hitherto been conventional to use the method and device explained hereinafter with reference to FIGS. 1 and 2.

The input 13 of an autocorrelator 11 receives the previously-defined stochastic signal V(t) and its output 14 delivers signals corresponding to a certain number (e.g. 400) of points 21 (see FIG. 2) of the autocorrelation function $\psi(\tau)$ of signal V(t). A computer 12 connected to the output of autocorrelator 11 calculates the time constant $\tau_e$ (see FIG. 2) of the autocorrelation function and delivers an output signal 15 corresponding to $\tau$e. Of course, computer 12 may also make the calculation "off-line", i.e. without being directly connected to the output of autocorrelator 11.

In general, the autocorrelation function of signal V(t) is defined by $$\psi(\tau) = \lim_{\Delta t \to \infty} \frac{1}{\Delta t} \int_{t_o}^{t_o + \Delta t} V(t)\, V(t + \tau)\, dt \quad (2)$$

Since integral (2) cannot of course be obtained over a infinitely long time, the function $\psi(\tau)$ obtained by the autocorrelator is subject to certain errors, which are due to the stochastic character of the physical phenomena from which the signal V(t) is derived. In order to reduce the effect of these errors, the time constant $\tau_e$ obtained by a computer program is usually adjusted by a least-square method so that it substantially corresponds with the experimental points given by the autocorrrelation. FIG. 2 represents the function delivered by the autocorrelator (the set of points 21) and the ideal exponential function 22 obtained by the aforementioned least-square method.

In order to reduce the expense of the apparatus and time for determining the time constant $\tau_e$, the invention aims to simplify the method of determining $\tau_e$. The invention is based on the following arguments.

Sine it is known that the curve obtained $\psi(\tau)$ is an exponential function, it is sufficient in theory to measure only two points on the curve, e.g. for $\tau_1$ and $\tau_2$. We shall then obtain two values $\psi(\tau_1)$; $\psi(\tau_2)$ from which we can deduce $\tau_e$:

$$\tau_e = \frac{\tau_2 - \tau_1}{\ln \frac{\psi(\tau_1)}{\psi(\tau_2)}} \quad (3)$$

The disadvantages of this method are clear. In order to obtain the same accuracy as for the least-square method, one must be sure that the measured values $\psi(\tau_1)$, $\psi(\tau_2)$ are subject to only a very small error; this means that the integration time for calculating these two points on the autocorrelation function will be longer than when the method of least squares is used. Furthermore, if the measuring device produces a systematic error in the calculation of the autocorrelation function (resulting e.g. in undulation of the function), the two chosen measuring points $\tau_1$, $\tau_2$ may be unfavorably situated. A third disadvantage of the method (i.e. of calculating only two points on the autocorrelation function) is that the information in all the rest of the function is lost.

Figure 2:
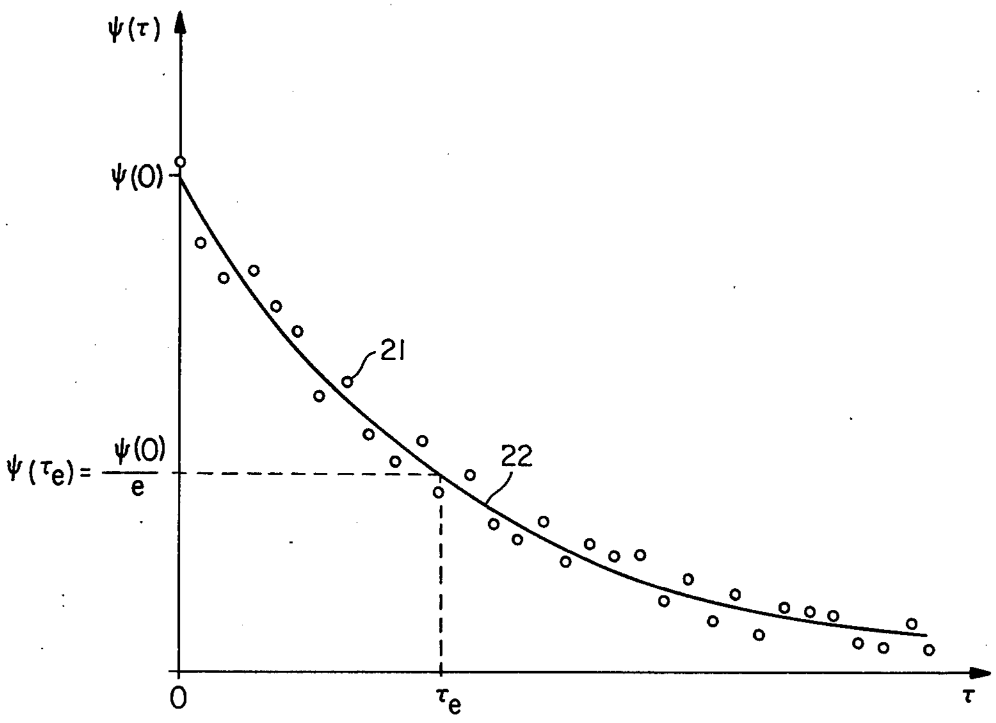
FIG. 2 graphically illustrates two diagrams of an autocorrelation function showing a set of measured values and a curve obtained by adjustment by a least-square method.
Figure 3:
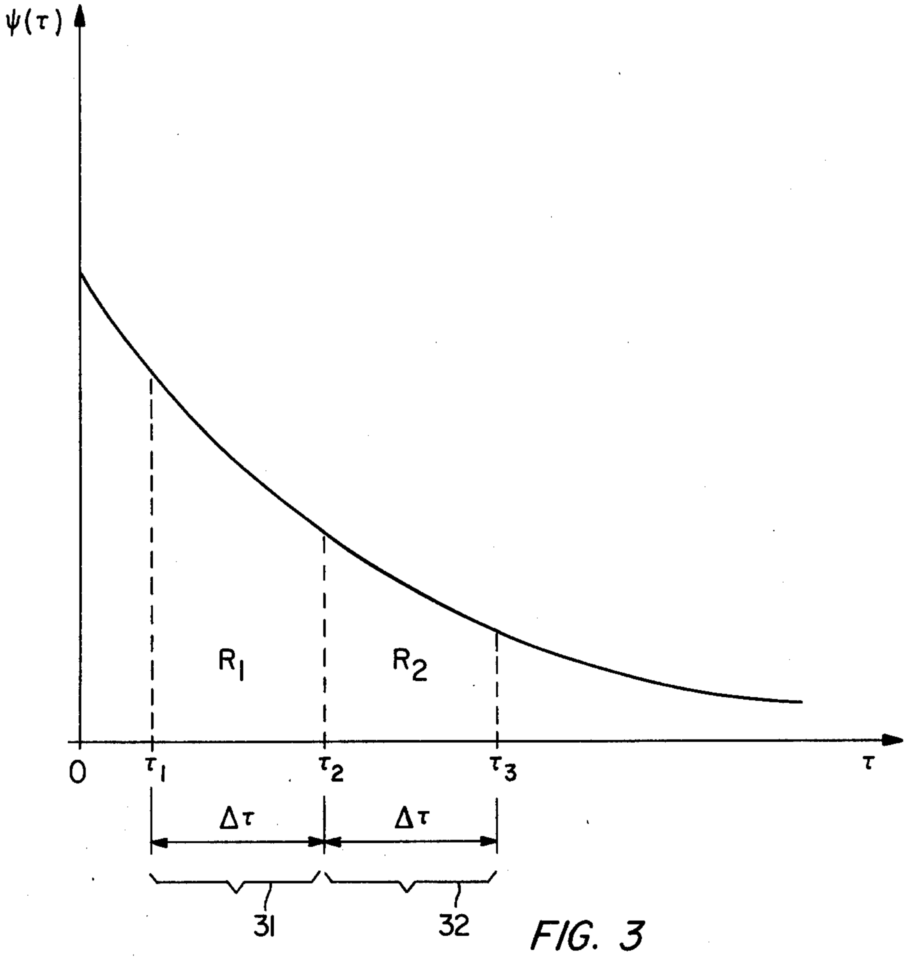
FIG. 3 graphically shows the principle of the method according to the invention, applied to the case of an exponential autocorrelation function.

The following is a description, with reference to FIG. 3, of a method according to the invention for obviating the aforementioned disadvantages and the disadvantages of the known method described hereinbefore with reference to FIGS. 1 and 2.

The range of delay times $\tau$ is divided into two regions 31, 32. Region 31 extends from $\tau_1$ to $\tau_2$, and region 32 from $\tau_2$ to $\tau_3$. For simplicity, it is convenient to choose two adjacent regions having the same length, i.e., $$\Delta\tau = \tau_3 - \tau_2 = \tau_2 - \tau_1 \quad (4)$$

However, the validity of the method according to the invention is in no way affected if the chosen regions 31, 32 have different widths or are not adjacent.

It is known that curve $\psi(\tau)$ is exponetial. It can therefore be shown that:

$$\frac{\int_{\tau_1}^{\tau_2} \psi(\tau)\, d\tau}{\int_{\tau_2}^{\tau_3} \psi(\tau)\, d\tau} = \frac{\psi(\tau)}{\psi(\tau + \Delta\tau)} \quad (5)$$

Equation (5) shows that the ratio $\psi(\tau_1)$ $\psi(\tau_2)$ appearing in equation (3) can be replaced by the ratio between two integrals:

$$R_1 = \int_{\tau_1}^{\tau_2} \psi(\tau)\, d\tau \quad (6)$$

$$R_2 = \int_{\tau_2}^{\tau_3} \psi(\tau)\, d\tau$$

This replacement largely eliminates the disadvantages of determining $\tau_e$ by simply measuring two points on the auto-correlation function.

Consequently, equation (3) is converted into:

$$\tau_e = \frac{\Delta\tau}{\ln \frac{R_1}{R_2}} \quad (7)$$

Figure 4:
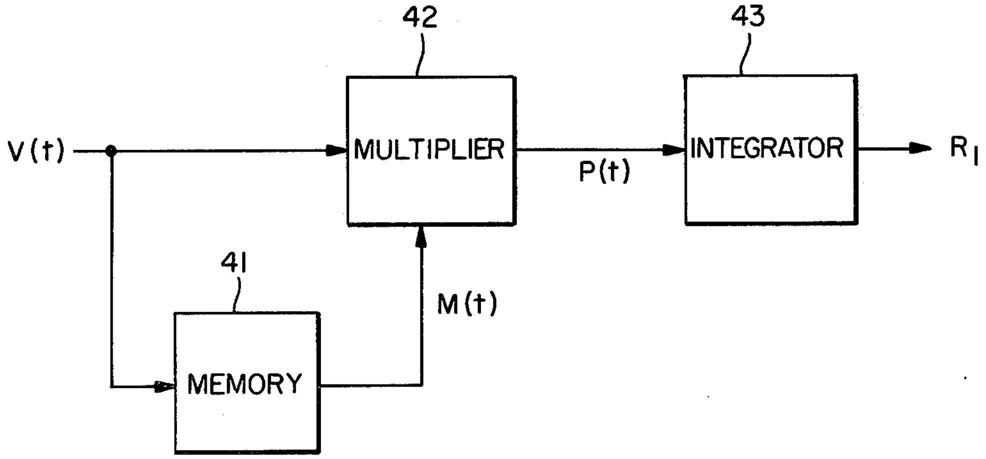
FIG. 4 is a symbolic block diagram of a basic circuit in a device according to the invention, for calculating a double integral Ror $R_2$.

FIG. 4 is a block diagram of a basic circuit of a device for working the method according to the invention. A signal V(t) is applied to the input of a store 41 and to one input of a multiplier 42 for forming the product P(t) of the input signal V(t) and the output signal M(t) of store 41. The resulting or product signal P(t) is in turn applied to the input of an integrator 43 which delivers an output signal corresponding to the integral $R_1$ defined by equation (6) hereinbefore.

In order to explain the operation of the circuit in FIG. 4, it is convenient to express $R_1$ using equations (2) and (6):

$$R_1 = \int_{\tau_1}^{\tau_2} \left[ \frac{1}{\Delta t} \int_{t_o}^{t_o + \Delta t} V(t)V(t+\tau)dt \right] d\tau \quad (8)$$

By inverting the two integrals and putting $\tau_1 = 0$ for simplicity, we can write:

$$R_1 = \frac{1}{\Delta t} \int_{t_o}^{t_o + \Delta t} \int_{0}^{\Delta\tau} V(t)V(t+\tau)\, dt\, d\tau \quad (9)$$

The circuit in FIG. 4 for determining $R_1$ according to equation (9) operates as follows:

The integral with respect to time t (from $t_o$ to $t_o + \Delta$ t) is obtained by an integrator 43 shown in FIG. 4. The integral with respect to the delay time $\tau$ is obtained by the fact that store 41 in FIG. 4 samples signal V(t) at intervals of $\Delta\ \tau$, so that during a time interval $\Delta\ \tau$ the delay time $\tau$ between V(t) and the stored value varies progressively from 0 to $\Delta\ \tau$.

Figure 5:
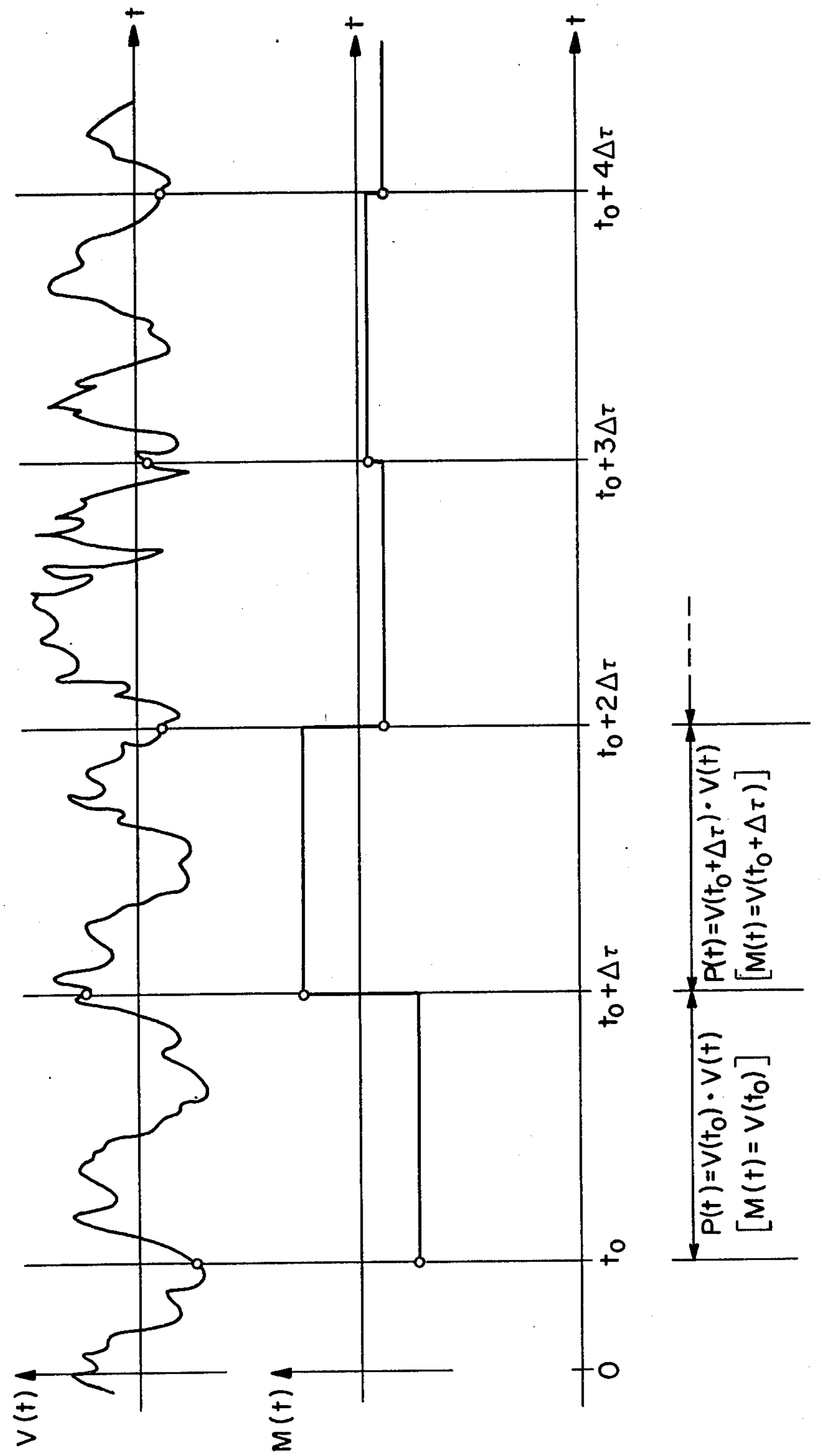
FIG. 5 graphically illustrates two diagrams of the stochastic signal V(t) in FIG. 1 and sampled values M(t) of the signal, in order to explain the operation of the circuit in FIG. 4.

As shown in FIG. 5, the instantaneous value of V(t) is stored at the time $t_o$, and is again stored at the times $t_o + \Delta\ \tau$, $t_o + 2\ \Delta\ \tau$ etc. i.e. during the time interval between $t_o$ and $t_o + \Delta\ \tau$, the product P(t) = V(t). M(t) is the same as V(t). V($t_o$); this is precisely the product which it is desired to form in order to obtain $R_1$ by equation (9). The integrator 43 in FIG. 4 integrates P(t) during a time $\Delta$ t.

By way of example, in order to measure a time constant $\tau_e$ of 1 ms, we shall take $\Delta\tau$ =1 ms and $\Delta\tau$= 30 s.

The integral $R_2$ is calculated in similar manner to integral $R_1$, except that the stored values are not delayed by a time which varies between 0 and $\Delta\tau$ with respect to V(t), but by a time which varies between $\Delta\tau$ and 2 $\Delta\tau$:

$$R_2 = \frac{1}{\Delta t} \int_{t_o}^{t_o + \Delta t} \int_{\Delta\tau}^{2\Delta\tau} V(t)V(t+\tau)\, dt\, d\tau \quad (10)$$

Figure 6:
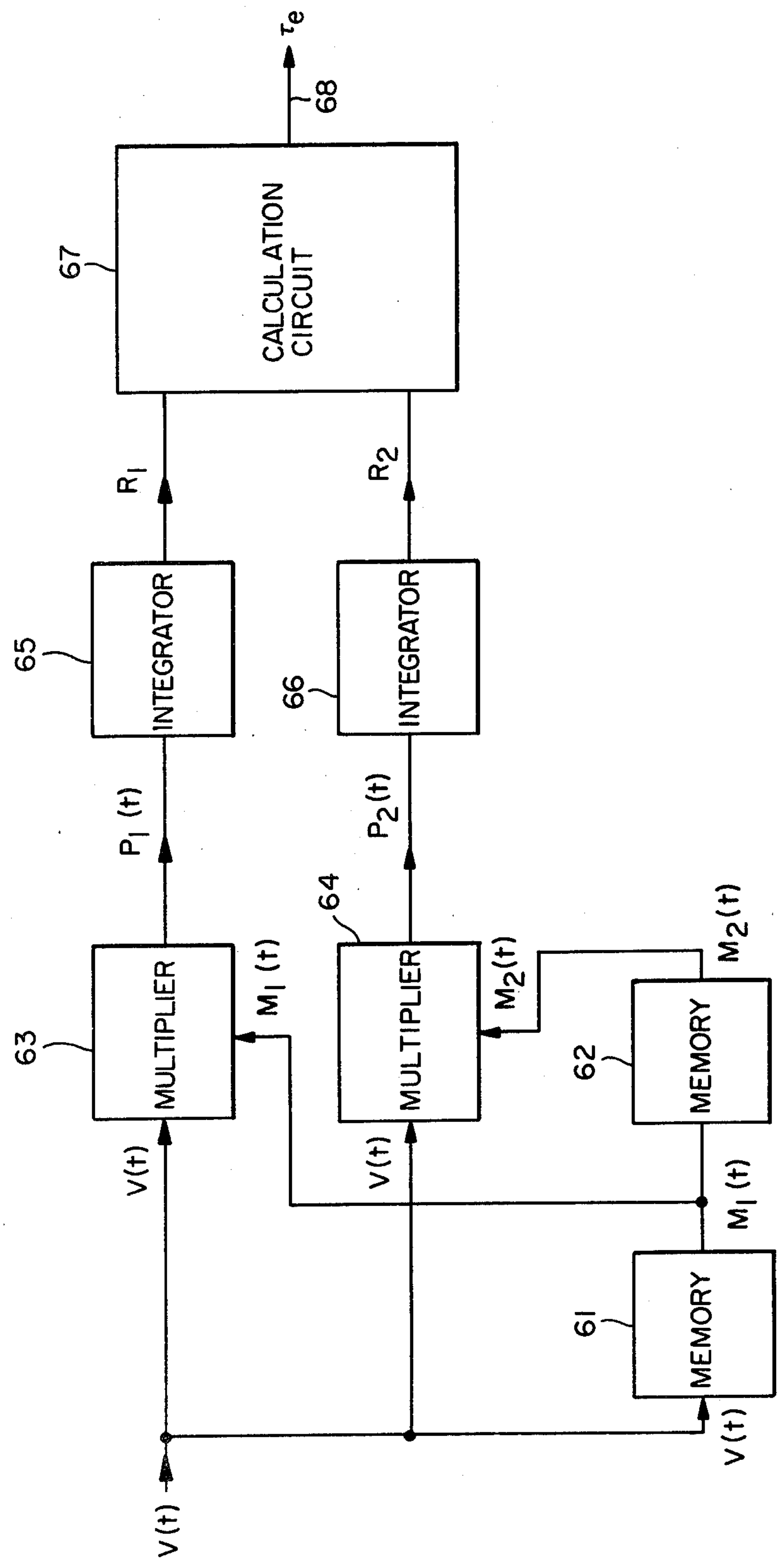
FIG. 6 is a symbolic block diagram of a device according to the invention.
Figure 7:
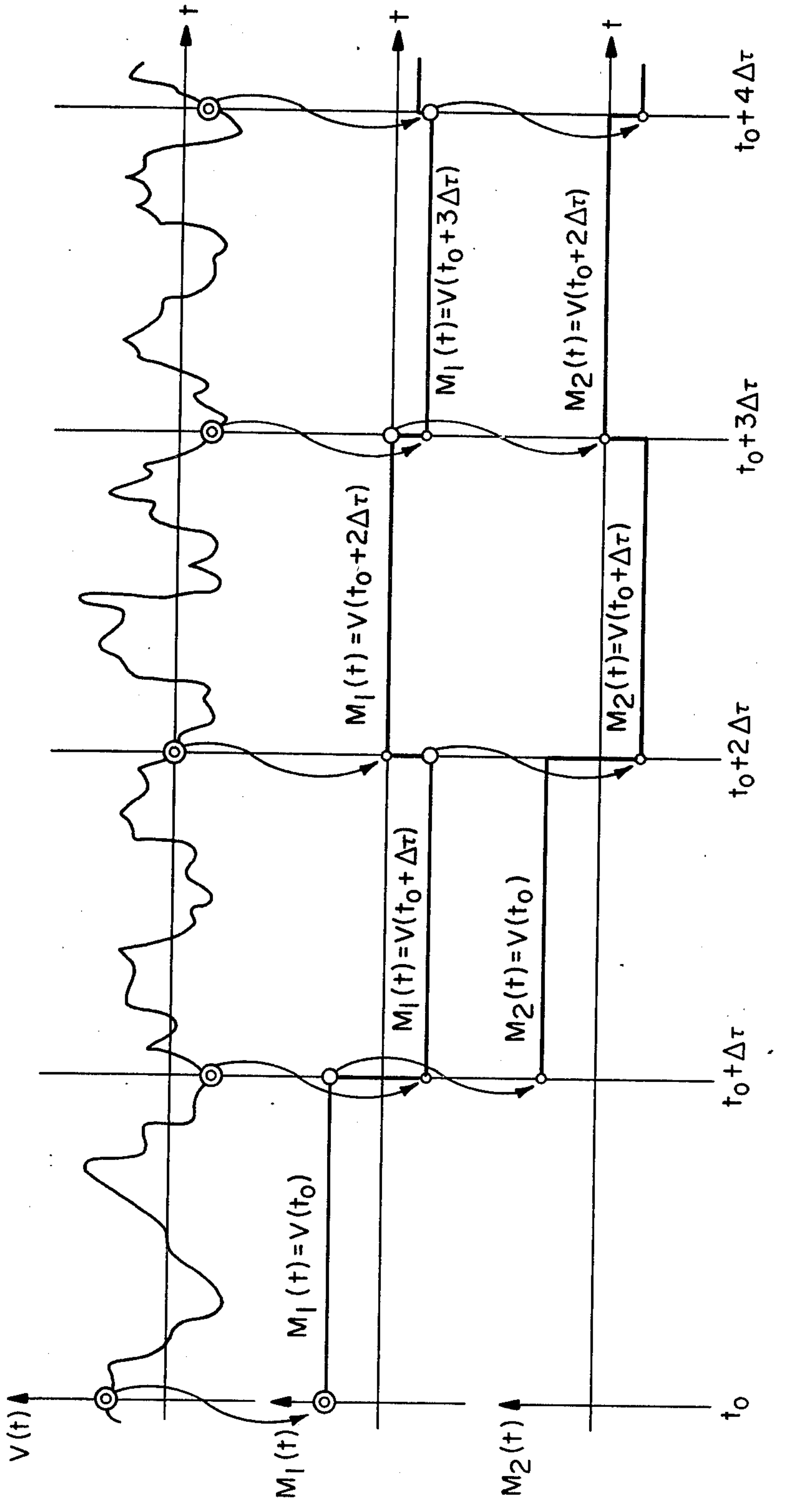
FIG. 7 graphically illustrates signals at different places in the device in FIG. 6.

FIG. 6 is a block diagram of the complete device, and FIGA. 7 illustrates its operation.

At the beginning of the time interval [$t_o + \Delta\tau$, $t_o$ + 2 $\Delta\tau$], store 61 stores the value v(to 30 $\Delta\tau$). At the same instant, 62 stores the value $M_1$ (t) = V($t_o$) which was previously stored in store 61, i.e. during the time interval [$t_o + \Delta\tau$, $t_o + \Delta\tau$]in question, we have $$M_1(t) = V(t_O + \Delta\tau)$$
$$M_2(t) = V(t_o) \quad (11)$$

During this interval, therefore the corresponding products $P_1$(t) and $P_2$(t) formed by multipliers 63, 64 are $$p_1(t) = V(t).\ V(t_o + \Delta\tau)$$
$$P_2(t) = V(t).\ V(t_o) \quad (12)$$

During the time interval to $+\Delta\tau$, therefore, the delay between the two terms of the products $P_1$(t) and $P_2$(t) progressively varies between 0 and $\Delta\tau$ for $P_1$ and between $\Delta\tau$ and 2 $\Delta\tau$ for $P_2$.

The functions $P_1$(t) and $P_2$(t) are integrated in two identical integrators 65, 66; the results of integration $R_1$, $R_2$are then transmitted to a computer circuit 67 which determines the time constant $\tau_e$ of the exponential autocorrelation function and gives an output signal 68 corresponding to $\tau_e$.

The circuit shown diagrammatically in FIG. 6 can be embodied in various ways, by analog or digital data processing. In the case of a digital embodiment, analog-digital conversion can be obtained with varying resolution (i.e. a varying number of digital bits). In the limiting case, the data can be processed by extremely coarse digitalization of one bit in one of the two channels (i.e. the direct or the delayed channel) — i.e., only the sign of the input signal V(t) is retained. The theory shows that the resulting autocorrelation function is identical with the function which would be obtained by using the signal V(t) itself, provided that the amplitude of the function V(t) has a Gaussian statistic distribution in time. A special case is shown hereinafter with respect to FIG. 8. In this example, only the signal from the delayed channel is quantified with a resolution of one bit.

The principle of this embodiment is as follows: a one-bit digital system is used to store the signal. It is simply necessary, therefore, for stores 81, 82 to store the sign V(t) (FIG. 8) obtained by comparing V(t) with a reference value $V_R$, which can be equal to or different from zero, in a comparator 84. For $V_R$=0 the following values appear at the store outputs:

$$M'_1(t) \triangleq \text{sign of } M_1(t)$$
$$M'_2(t) \triangleq \text{sign of } M_2(t) \quad (13)$$

Next, V(t) is multiplied by $M'_1$ and $M'_2$ as follows:

If $M'_1$(t) is positive, a switch 85 makes a connection to the correct input V(t). In the contrary case, i.e. if $M'_1$ is negative, switch 85 makes the connection to the signal −V(t) obtained by inverting the input signal V(t) by means of an amplifier 83 having a gain of −1. The two products $P'_1$(t) and $P'_2$ (2) are obtained in the same manner:

$$P'_1(t) = [\text{sign of } M_1(t)].V(t)$$
$$P'_2(t) = [\text{sign of } M_2(t)].V(t) \quad (14)$$

Next, values $R_1$, $R_2$ are obtained simply by integrating $P'_1$, $P'_2$ using simple analog integrators 87, 88. The circuit 89 for calculating the time constant $\tau_e$ can be analog, digital or hybrid.

The circuit shown in FIG. 6 is made up of two identical computer circuits, each comprising a store, a multiplier and an integrator as shown in FIG. 4 and a circuit 67 for calculating the time constant. Each computer circuit in FIG. 4 can be generalized and given the form shown in FIG. 9 or FIG. 10.

Figure 9:
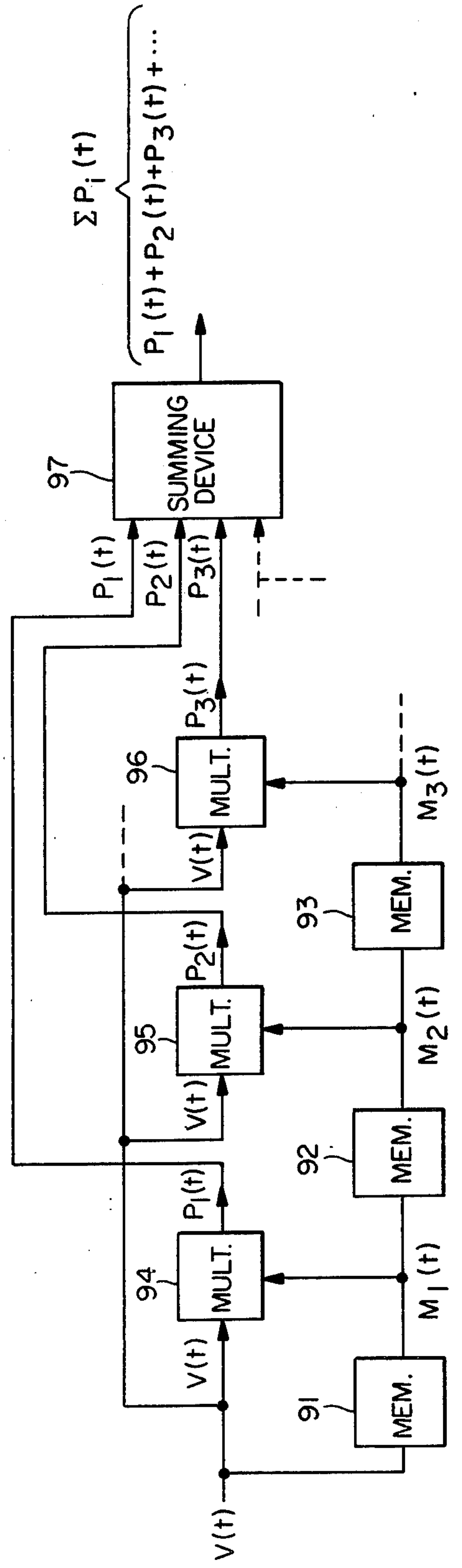
FIGS. 9 and 10 are block diagrams of two equivalent general embodiments of the basic circuit according to the block diagram in FIG. 4.
Figure 10:
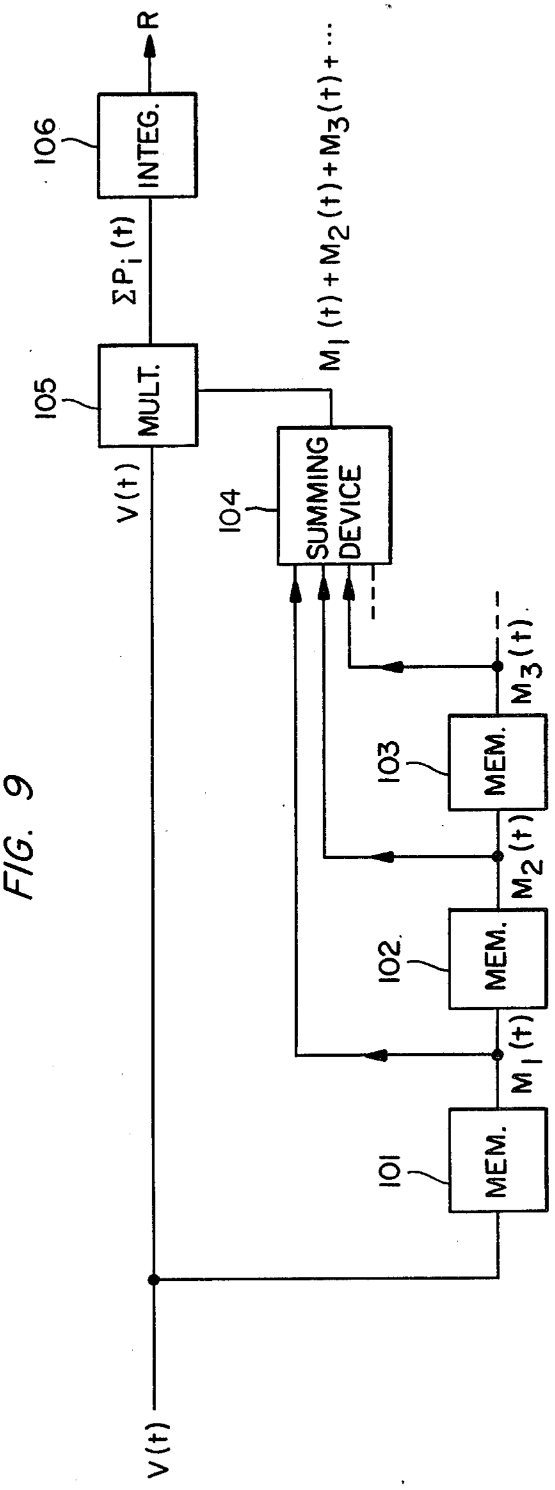

The generalized forms shown in FIGS. 9 and 10 are equivalent, as will be shown hereinafter.

At the time $t_o$, the value of the input signal V(t) is stored in store 91, i.e.:

$$M_1(t)=V(t_o) \text{ for } t_o<t<t_o+\tau' \qquad (15)$$

At the time $t_o+\tau'$, a new value of V(t) is stored in store 91. At the same time, the value previously contained in store 91 is transferred to store 92, i.e.:

$$\left.\begin{array}{l} M_1(t) = V(t+\tau') \\ M_2(t) = V(t_o) \end{array}\right\} \text{ for } t_o+\tau'<t<t_o+2\tau' \qquad (16)$$

Similarly, in the time interval $to+2\tau'<to<to+3\tau'$ we have:

$$M_1(t)=V(t_o+2\tau')$$

$$M_2(t)=V(t_o+\tau')$$

$$M_3(t)=V(t_o) \qquad (17)$$

During this time interval, the three multipliers 94, 95, 96 shown in FIG. 9 output a signal $$P_i(t)=M_i(t).V(t) \qquad (18)$$

or, more precisely:

$$P_1(t)=M_1(t0\cdot V(t)=V(t_o+2\tau'\cdot V(t)$$
$$P_2(t)=M_2(t)\cdot V(t)=V(t_o+\tau')\cdot V(t)$$
$$P_3(t)=M_3(t)\cdot V(t)=V(t_o)\cdot V(t) \qquad (19)$$

The products $P_1(t)$, $P_2(t)$, $P_3(t)$ are added in summator 97 and the resulting sum $$\Sigma P_i(t)=P_1(t)+P_2(t0+P_3(t) \qquad (20)$$

is applied to an integrator (e.g. 43 in FIG. 4) which delivers an output signal corresponding to $R_1$ or $R_2$.

If we limit ourselves to a series of three stores per computer circuit (as in the example shown in FIG. 9) and if we put $$\tau'=\Delta\tau/3 \qquad (21)$$

where $\Delta\tau$=computer time constant defined by equation (4) hereinbefore (compare FIG. 3), we obtain a result similar to that obtained with the simple version in FIG. 4 (using one store per computer circuit), but the accuracy of calculation is improved by dividing the single store in FIG. 1 into the three stores or more in FIG. 9.

If expression (20) is re-written to show V(t) more clearly, we have:

$$\Sigma P_i(t)=V(t)\cdot[M_1(t)+M_2(t)+M_3(t)] \qquad (22)$$

It can easily be seen that the thus-obtained expression (22) represents the product P(t) obtained at the outlet of the multiplier in the circuit shown in FIG. 10. We have thus shown that diagrams 9 and 10 are equivalent.

Figure 11:
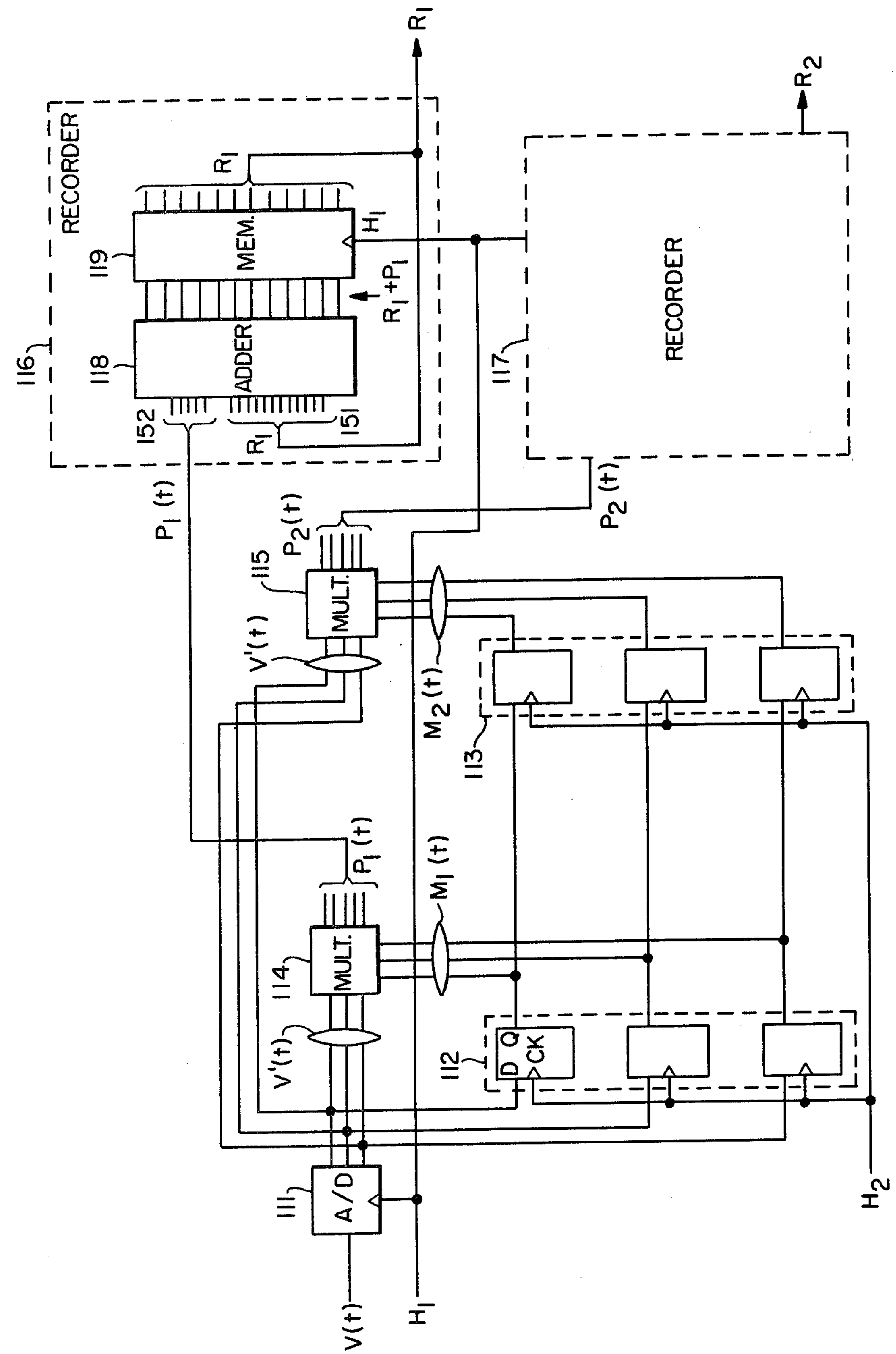
FIG. 11 is a block diagram of a mainly digital version of a device according to the invention.

FIG. 11 is a diagram of a detailed example of a digital embodiment of the block diagram in FIG. 6.

An input signal V(t) is applied to an analog-digital converter 111. A clock signal $H_1$ brings about analog-digital conversions at a suitable frequency, e.g. 100kHz (i.e. $10^5$ analog-digital conversions per second).

A second clock signal $H_2$ periodically (e.g. at intervals $\Delta\tau=1$ ms$=10^{-3}s$) actuates the storage of the digital value corresponding to signal V(t) in a store 112. In the chosen example, the analog-digital converter 111 has a resolution of three bits and store 112 is made up of three D-type trigger circuits. At the same time as a new value is being stored in store 112, clock signal $H_2$ transfers the previously-contained value from store 112 to a store 113 which is likewise made up of three D-type trigger circuits.

Consequently, a multiplier 114 receives the signal V(t) (the digital version of the input signal V(t) at the rate of $10^5$ new values per second, and also receives the stored digital signal $M_1(t)$ at the rate of $10^3$ numerical values per second. Thus, output $P_1$ of multiplier 114 is a succession of digital values following at the rate of $10^5$ values per second.

Registers 116, 117 are used instead of integrators 65, 66 in FIG. 6. Each register comprises an adder 118 and a store 119 which in turn is made up of a series of e.g. D-type trigger circuits. At a given instant, store 119 contains the digital value $R_1$. As shown in FIG. 11, value $R_1$ is applied to one input 151 of adder 118, whereas the other input 152 receives the product $P_1(t)$ coming from multiplier 114. The sum $R_1 + P_1$ (t) appears at the output of adder 118. At the moment when the clock pulse $H_1$ is applied to store 119, the store records the value $R_1 + P_1$ (t) (this new value $R_1 + P_1$ (t) replaces the earlier value $R_1$). As already mentioned, in the chosen example the multiplier 114 delivers $10^5$ new values of $P_1$ (t) per second (due to the fact that it receives $10^5$ values of V'(t) per second from analog-digital converter 111, the rate being imposed by clock $H_1$). Register 116 therefore will accumulate data at the frequency of $10^5$ per second, under the control of clock $H_1$.

Register 117 is constructed in identical manner with register 117 and therefore does not need to be described.

A control circuit (not shown in FIG. 11) resets the stores and registers to zero before the beginning of a measurement, delivers clock signals $H_1$ and $H_2$ required for the operation of the device, and stops the device after a predetermined time. At the end of the accumulation phase (typical duration: 10 sec. to 1 min), the two values $R_1$, $R_2$ in registers 116, 117 are supplied to a circuit (not shown in FIG. 11) which calculates the time constant.

In an important variant of this manner of operation, the device does not have an imposed integration time, since it is known that the contents of $R_1$ is always greater than the contents of $R_2$. Consequently, integration can be continued as long as required for register $R_1$ to be "full" (i.e. by waiting until its digital contents reaches its maximum value. The calculation of the time constant is thus simplified, since $R_1$ becomes a constant.

There are innumerable possible digital embodiments of the method according to the invention. Here are a few examples:

Any kind of analog-numerical converter (unit 111 in FIG. 11) can be used, e.g. a parallel converter, by successive approximation, a "dual-slope", a voltage-frequency converter, etc. The number of bits (i.e. the resolution of converter 111) can be chosen as required.

Stores 112, 113 and 119 can be flip-flops, shift registers, RAM's or any other kind of store means.

The multipliers can be of the series of parallel kind.

In an important variant, an incremental system is used; registers 116 and 117 are replaced by forward and backward counters. In that case, a new product P(t) is added to the register contents by counting forwards or backwards a number of pulses proportional to P(t). In that case, the multipliers can be of the "rate multiplier" kind.

Figure 8:
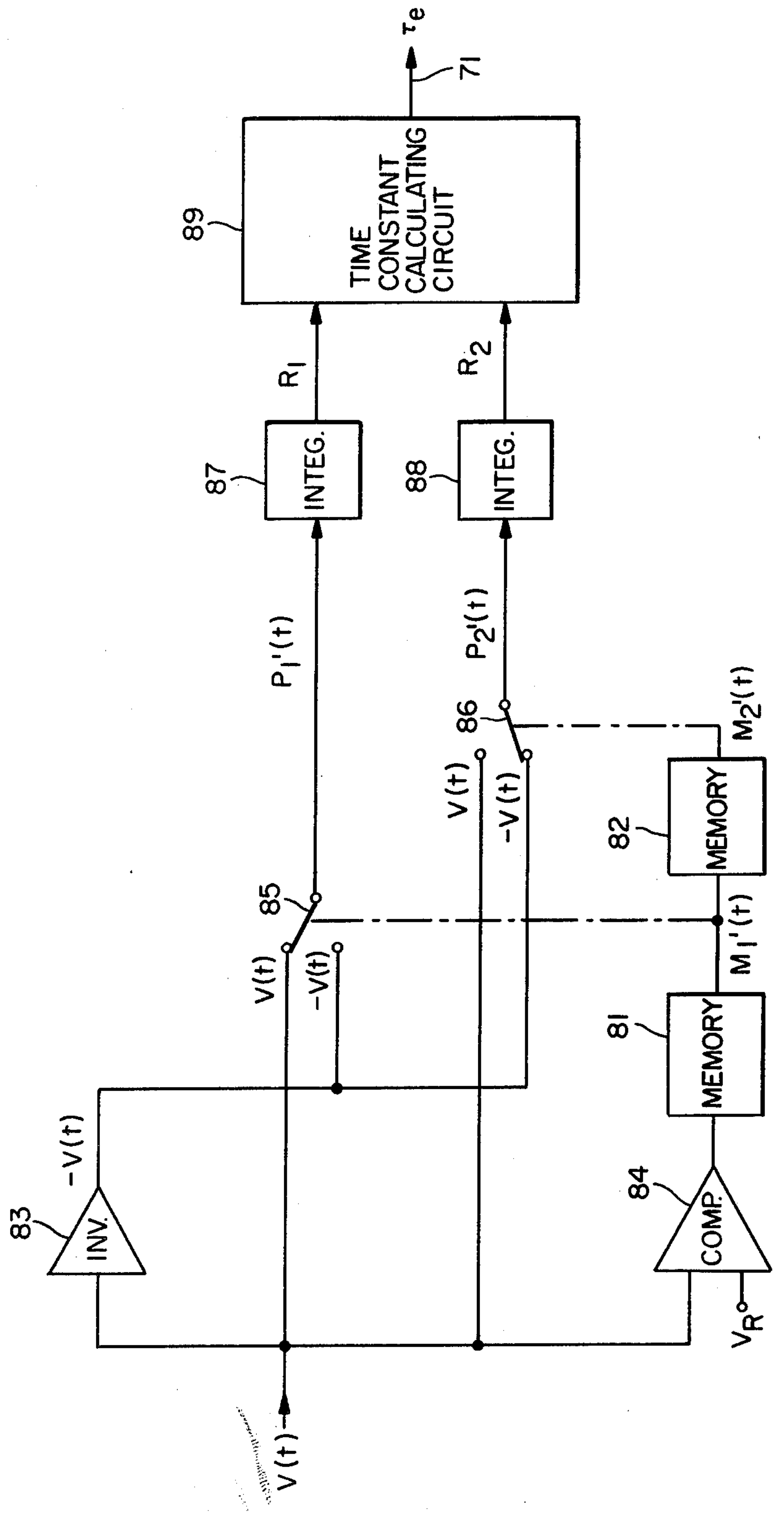
FIG. 8 is a block diagram of a hybrid version of the device according to the invention.
Figure 12:
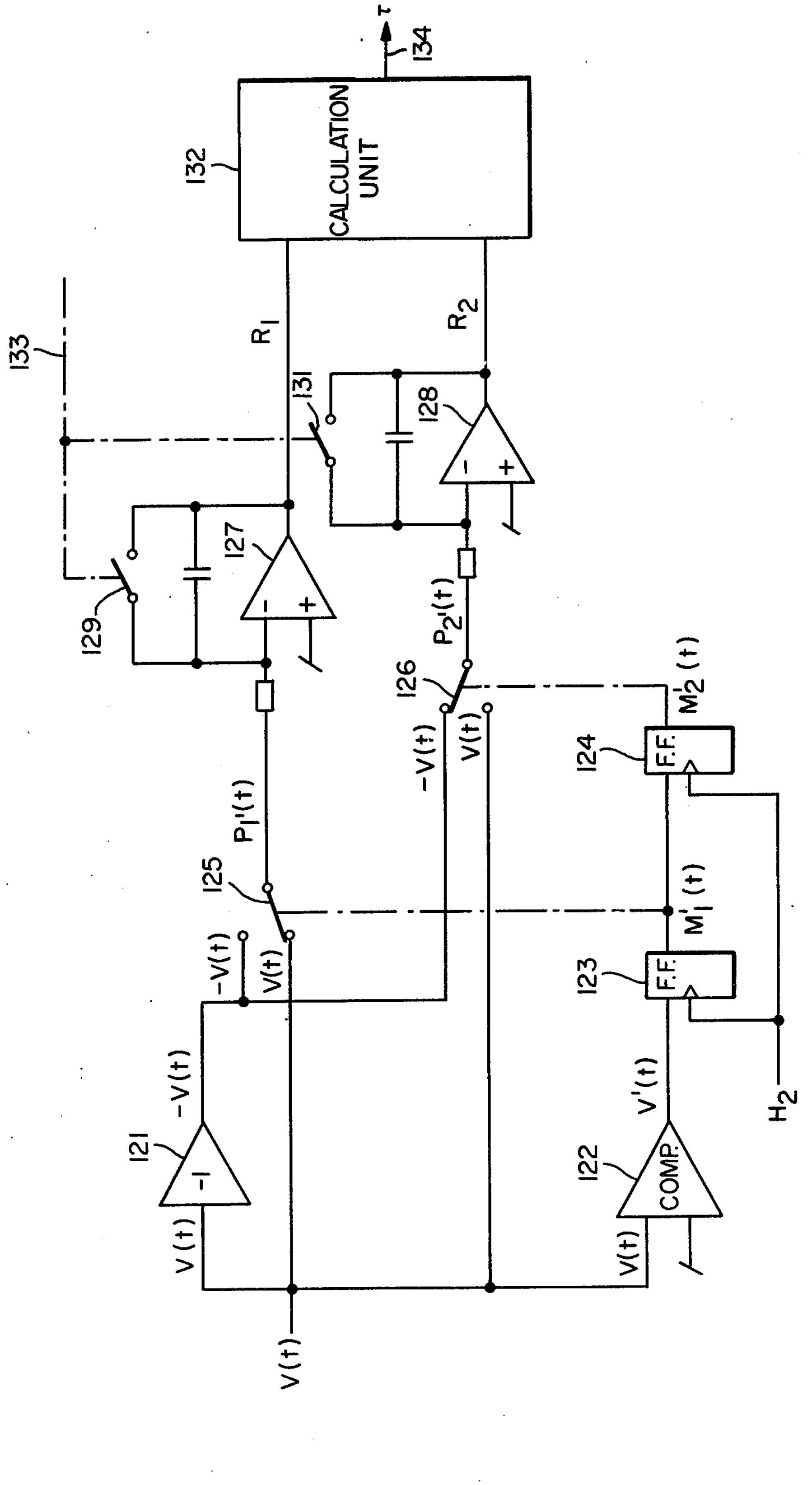
FIG. 12 is a block diagram of a modified version of the hybrid device according to FIG. 8.

FIG. 12 is a diagram of a hybrid embodiment similar to that shown in FIG. 8.

In the diagram in FIG. 12, the input signal V(t) is applied to the input of a comparator 122 which outputs a logic signal V'(t) corresponding to the sign only of V(t). For example, V'(t) will be a logic L when V(t) is positive, and 0 when V(t) is negative. The logic signal V'(t) is then stored in a trigger circuit 123 at the rate fixed by clock $H_2$ (the same as in the digital case, e.g. with a frequency of kHz). The same clock signal $H_2$ conveys the information from circuit 123 to a second trigger circuit 124.

In the last-mentioned embodiment, the input signal V(t) is multiplied by the delayed signal $M_1'(t)$ or $M_2(t)$ as follows:

In the case where $M_1'(t)$ is a logic 1 (corresponding to a positive V(t)), a switch 125 actuated by the output $M_1'(t)$ of trigger circuit 123 is connected to V(t). In the contrary case ($M_1'(t)=0$, and V(t) is negative), switch 125 is connected to the signal $-V(t)$ coming from inventer 121. A second switch 126 operates in similar manner.

It can be seen, therefore, that the two switches 125 and 126 can multiply the input signal V(t) by +1 or −1. In other words:

$$P'_i(t)=V(t)E \text{ if } M'_i(t)=1$$
$$P'_i(t)=-V(t) \text{ if } m'_i(t)=0 \quad (23)$$

$P_1'(t)$ and $P_2'(t)$ are integrated by two integrators 127 and 128. At the beginning of the measurement, the last-mentioned two integrators are reset to zero by switches 129 and 131 actuated by a signal 133 coming from the control circuit (not shown in FIG. 12) which gives general clock pulses. After a certain integration time, which is preset by the means controlling the device (mentioned previously), integration is stopped and the values of $R_1$ and $R_2$ are read and converted, by means of a computing unit 132, into an output signal 134 corresponding to the time constant.

Starting from the circuit in FIG. 12, vaious other embodiments are possible, i.e.

(a) Exponential averaging

Figure 13:
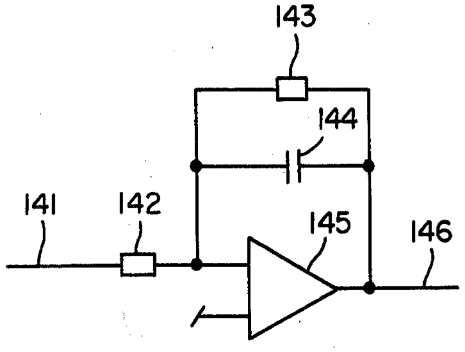
FIG. 13 is a schematic diagram of a modified version of the integrators 127, 128 in FIG. 12.

Integrators 128 and 128 are modified as in FIG. 13. As can be seen, the switch for resetting the integrator to zero has been replaced by a resistor 143 disposed in parallel with an integration capacitor 144. Thus, the integration operation is replaced by a more complex operation, i.e. exponential averaging, which can be symbolically represented as follows:

$$-u_2 = \frac{r_a}{r_b} \frac{1}{1 + r_a \cdot C \cdot p} u_1 \quad (24)$$

where $u_1$=Laplace transform of the input signal $u_2$=Laplace transform of the output signal p=Laplace variable (="the differentiation with respect to time" operator)

$r_a$=value of resistor 143

$r_b$=value of resistor 142

C=value of integration capacitor 144.

$r_a$ is made much greater than $r_b$ and it can be seen intuitively that the output voltage of a modified integrator of this kind tends towards a limiting value (with a time constant equal to $r_aC$). In this variant, the device for resetting the integrators to zero can be omitted and the integrators can permanently output the values $R_1$, $R_2$ required for calculating the time constant.

(b) Increasing the resolution of the digital part

Comparator 122 and trigger circuits 123 and 124 can be replaced by a more complex analog-digital converter, i.e. having more than one bit and followed by stores of suitable capacity. The multipliers multiplying the analog signal V(t) by numerical values $M_1'(t)$ and $M_2'(t)$ will have a more complicated structure than a simple switch; multiplying digital-to-analog converters are used for this purpose.

(c) Purely analog version

The circuit comprising comparator 122 and trigger circuits 123 and 124 (FIG. 12) can be replaced by a number of sample and hold amplifiers for storing the input signal V(t) in analog form. In the case of a purely analog voltage, switches 125 and 126 will be replaced by analog multipliers which receive the direction input signal V(r) and also receive the signal from the corresponding sample and hold amplifier.

A particularly interesting application of the device according to the invention will now be described with reference to FIG. 14.

Figure 14:
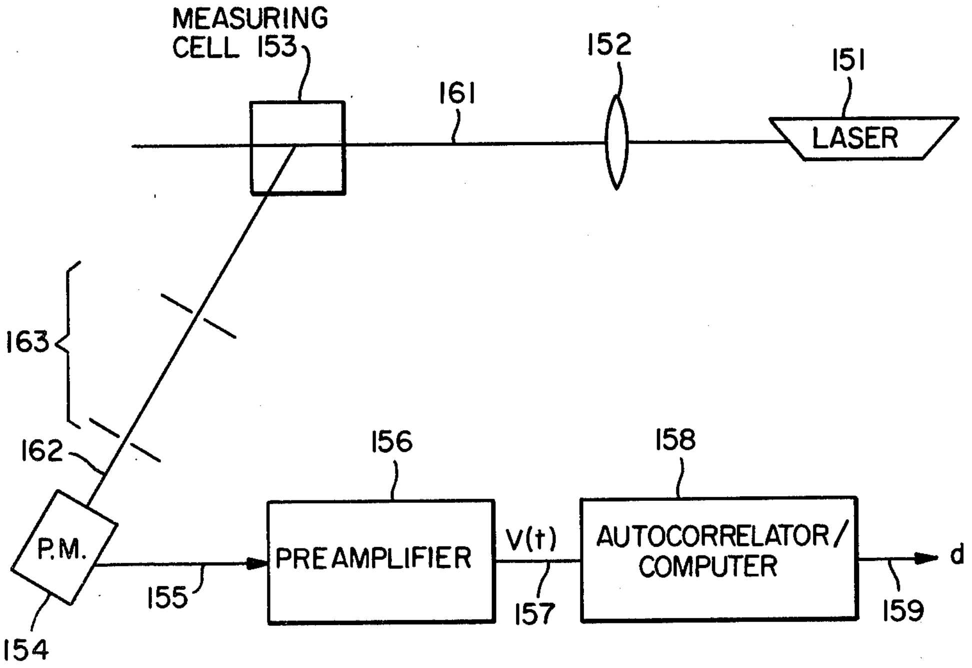
FIG. 14 is a symbolic block diagram of a known device for measuring the size of particles, in which a device according to the invention may advantageously be used.

It has already been proposed to determine the size of particles in suspension in a solvent, by means of a light-wave beat method using a homodyne spectrometer as shown diagrammatically in FIG. 14 (B. Chu, Laser Light scattering, Annular Rev. Phys. Chem. 21 (1970), page 145 ff). The spectrometer operates as follows:

A laser beam is formed by a laser source 151 and an optical system 152 and travels through a measuring cell 153 filled with a sample of a suspension containing particles, the size of which has to be determined. The presence of the particles in the suspension causes slight inhomogeneities in its refractive index. As a result of these inhomogeneities, some of the light of the laser beam 161 is diffused during its travel through the measuring cell 153. A photomultiplier 154 receives a light beam 162 diffused at an angle $\theta$ through a collimator 163 and, after amplification in a pre-amplifier, gives an output signal V(t) corresponding to the intensity of the diffused laser beam.

As already explained, Brownian motion of particles in suspension produces fluctuations in the brightness of the diffused beam 162. The frequency of the fluctuations depends on the speed of diffusion of the particles across the laser beam 161 in the measuring cell 153. In other words, the frequency spectrum of the fluctuations in the brightness of the diffused beam 162 depends on the size of the particles in the suspension.

Let v(t) be the electric signal coming from photomultiplier 154 followed by preamplifier 156. Like the motion of the particles in suspension, the signal is subjected to stochastic fluction having a power spectrum given by the relation $$P(w) = aI_s + bI_s^2 \frac{2\Gamma/\pi}{w^2 + (2\Gamma)^2} \quad (25)$$

In the second member of equation (25), the first term represents shot-noise, which is always present at the output of a photodetector measuring a light intensity equal to $I_s$. The second term is of interest here. It is due to the random (Brownian) motion of the particles illuminated by a coherent light source (laser).

a and b are proportionality constants, $I_s$ is the diffused light intensity, and $2\Gamma$ is the bandwidth of the spectrum which is described by a Lorentzian function. $\Gamma$ is directly dependent on the diffusion coefficient D of the particles. We have $$\Gamma = DK^2 \quad (26)$$

$$K = \frac{4\pi n}{\lambda} \sin\frac{\theta}{2} \quad (27)$$

where the amplitude of the diffusion vector (n, $\lambda$ and $\theta$ respectively are the index of refraction of the liquid, the wavelength of the laser and the angle of diffusion). The diffusion coefficient D for spherical particles of diameter d is given by the Stokes-Einstein formula $$D = \frac{kT}{3\pi\eta d} \quad (28)$$

where k, T and $\eta$ respectively are the Boltzmann constant, the absolute temperature and the viscosity of the liquid.

Consequently, if $\Gamma$ is determined experimentally, the size of the particles can be calculated from the previously-given relation. In the case of non-spherical particles, the average size is obtained.

As explained in the reference already cited in brackets (B. Chu, Laser Light scattering, Annual Rev. Phys. Chem. 21 (1970), page 145 ff), the determination can be made by ananyzing the fluctuations of the signal V(t), using either a wave analyzer or an arrangement 158 comprising an autocorrelator and a special computer.

The second method is usually preferred today, since the fluctuations are low frequencies (of the order of 1 kHz or less). The information obtained by both methods is identical, since the autocorrelation function $\psi(\tau)$ is the Fourier transform of the power spectrum, i.e.

$$\psi(\tau) = \int_{-\infty}^{\infty} P(w)\cos(w\tau)dw \quad (29)$$

(Wiener-Khintchine theorem)

In the special case of the diffusion spectrum, we find:

$$\psi(\tau) = aI_S\delta(\tau) + bI_s^2 e^{-2\Gamma\tau} \quad (30)$$

The first term is a delta function centered at the origin $\tau=0$ and represents the shot-noise contribution. The second term is an exponential function having a time constant $$\tau_e = \frac{1}{2\Gamma} \quad (31)$$

Using relations (26), (27), (28) and (31), we can write $$d = \frac{2kT}{3\pi\eta}\left(\frac{4\pi\eta}{\lambda_o}\sin\frac{\theta}{2}\right)^2 \cdot \tau_e \quad (32)$$

In the case where water at 25° is used as solvent, a time constant $\tau_e$ of 1 millisecond corresponds to a particle diameter d of 0.3 $\mu$m.

It can be seen from relation (32) that the size of the diffused particles can be determined by measuring the time constant $\tau_e$ of the autocorrelation function of the signal V(t) coming from the photodetector.

It has already been proposed to measure $\tau_e$ using the method and arrangement described hereinbefore in detail with reference to FIGS. 1 and 2. The disadvantage of the known arrangement is that the units used (i.e. an autocorrelator and a special computer) are relatively expensive and bulky.

In view of the disadvantages, the arrangement 158 in FIG. 14 is with advantage replaced by a device according to the invention.

As the preceding clearly shows, the method and device according to the invention can considerably reduce the cost and volume of the means required for determining the time constant. As can be seen from the embodiments described hereinbefore with reference to FIGS. 4–13, the means used to construct a device according to the invention are much less expensive and less bulky than an arrangement made up of commercial autocorrelator and special-computer units for calculating the time constant of an autocorrelation function. It has been found, using practical embodiments, that a device according to the invention can have a volume about fifty times as small as the volume of the known arrangement in FIG. 1.

Although the previously-described example relates only to the use of the invention for determining the diameter of particles suspended in a liquid, it should be noted that the invention can also be used to detect a gradual change in the dimension of the particles, e.g. due to agglutination. For this purpose, it is unnecessary to determine the absolute particle size as previously described, since a change in the size of the particles can be detected simply by using double integrals such as $R_1$ and $R_2$. In addition, the invention can also be used for continuously measuring the dimension of the particles, so as to observe any variations therein.

The following examples shows that the method and device according to the invention can be applied not only to determining the time constant of an exponential autocorrelation function decreasing in the manner described, but can also be used to determine the parameters of any autocorrelation function whose form is known. In addition, the input signal V(t) can be of any kind.

If, for example, the autocorrelation function $\psi(\tau)$ is linear and decreases with $\tau$, it is defined by:

$$\psi(\tau) = A - B\tau \text{ with } B > O \quad (33)$$

In the case where register 116 (with B>O(in the circuit in FIG. 11) integrates over the range from $\tau=O$ to $\tau=\Delta t$ (to obtain a signal representing the integral $R_1$) and register 117 integrates from $\tau=\Delta\tau$ to $\tau=2\Delta\tau$ (to obtain a signal representing the integral $R_2$), the parameters A and B in equation (33) are given by $$A = \frac{3R_1 - R_2}{2\Delta\tau} \quad B = \frac{R_1 - R_2}{(\Delta\tau)^2} \tag{34}$$

If, for example, the autocorrelation function has the form of a Gaussian function defined by:

$$\psi(\tau) = e^{-\lambda\tau^2} \text{ with } \lambda > 0 \tag{35}$$

and if registers 116 and 117 (in the diagram in FIG. 11) integrate over the ranges previously given in the case of the linear function, we have the relation:

$$\frac{R_1 + R_2}{R_1} = \frac{erf\left[\sqrt{2\lambda}\,(2\Delta\tau)\right]}{erf\left[\sqrt{2\lambda}\,\Delta\tau\right]} \tag{36}$$

with erf=error function.

$\lambda$ can be obtained by solving equation (36). Although this equation is transcendental and does not have a simple analytical solution, it can be solved by numerical or analog methods of calculation, using a suitable electronic computer unit.

In the case where the device according to the invention is applied to photon beat spectroscopy, there are two important cases where the autocorrelation function is in the form $$\psi(\tau) = \psi_o \exp\left(-\frac{|\tau|}{\tau_e}\right) + K \tag{37}$$

where K=const.

These two cases are:

The measurement of very low levels of diffused light and

One-bit quantification, i.e. the "add-subtract" method, with a reference level different from zero (as described hereinbefore with reference to FIG. 8).

The method according to the invention can be modified so as to determine the time constant $\tau_e$ in the two previously-mentioned cases. For this purpose, it is sufficient to calculate at least a third double integral $R_3$ having a similar form to $R_1$ and $R_2$ and defined by $$R_3 = \frac{1}{\Delta t}\int_{to}^{to + \Delta t}\int_{\tau_3}^{\tau_3 + \Delta\tau} V(t)\,V(t + \Delta t)\,dt\,d\tau \tag{38}$$

with $\tau_3 > \tau_2 > \tau_1$.

The integration time ranges for calculating $R_1$, $R_2$ and $R_3$ respectively $[\tau_1, \tau_2+\Delta\tau]$, $[\tau_2, \tau_2+\Delta\tau]$ $[\tau_3, \tau_3+\Delta\tau]$. Accoringly, the electronic computer unit must calculate $\tau_e$ and, if required, K from a knowledge of the integration limits and the accumulated values of $R_1$, $R_2$ and $R_3$. $\tau_1$, $\tau_2$ and $\tau_3$ can be chosen so as to obtain a simple analytical solution of the problem. Two possibilities will be considered:

The case where $$\tau_3 - \tau_2 = \tau_2 - \tau_1. \tag{39}$$

The time constant $\tau_e$ is:

$$\tau_e = \frac{\tau_2 - \tau_1}{\ln\dfrac{R_1 - R_2}{R_2 - R_3}} \tag{40}$$

The case where $$\tau_3 >> \tau_e. \tag{41}$$

In this case, the value accumulated in $R_3$ is very close to $K.\Delta\tau$ and we obtain:

$$\tau_e = \frac{\tau_2 - \tau_1}{\ln\dfrac{R_1 - R_3}{R_2 - R_3}} \tag{42}$$

The numerator of the fractions in the expressions (40) and (42) is a constant related related to the construction of the device; consequently the determination of $\tau_e$ is as simple as in the case of equation (7) hereinbefore.

$R_1$, $R_2$ and $R_3$ can e.g. be calculated as described with reference to FIG. 11, by adding the elements necessary for forming $R_3$.

However, it is not absolutely necessary to use an additional register to work the last-mentioned modified method. It is also possible, using two registers $R'_1$ and $R'_2$, to calculate the values $$R_1' = R_1 - R_2$$
$$\text{and } R_2' = R_2 - R_3 \tag{43}$$

directly in case (39), or the values $$R_1'' = R_1 - R_3$$
$$\text{and } R_2'' = R_2 - R_3 \tag{44}$$

directly in the case (41).

These operations are particularly easy to carry out in an "add-subtract" configuration, in a forward and backward counting configuration or in the analog case. In case (41), for example, the products $P_1(t)$ and $-P_3(t)$ will be accumulated in the same register $R_1''$.

The main advantage of the method and device according to the invention is a considerable reduction in the price and volume of the means necessary for making the measurement.

What is claimed is:

1. An electronic circuit for processing an electrical input signal V(t) ) variable with time and whose autocorrelation function $\psi(\tau)$ defined by $$\psi(\tau) = \lim_{\Delta t \to \infty} \frac{1}{\Delta t}\int_{t_o}^{t_o + \Delta t} V(t)\,V(t + \tau)\,dt$$

has a known shape, to derive an output signal corresponding to a parameter of the autocorrelation function, comprising: means for deriving a first auxiliary signal corresponding to a first double integral $R_1$ having the general form $$R_1 = \frac{1}{\Delta t}\int_{t_o}^{t_o + \Delta t}\int_{\tau_a}^{\tau_b} V(t)\,V(t + \tau)\,dt\,d\tau$$

and a second auxiliary signal corresponding to a second double integral $R_2$ having the general form $$R_2 = \frac{1}{\Delta t} \int_{t_o}^{t_o + \Delta t} \int_{\tau_c}^{\tau_d} V(t)\, V(t + \tau)\, dt\, d\tau$$

where the values of $\tau_a$, $\tau_b$, $\tau_c$, $\tau_d$ define integration ranges in the delay-time $\tau$ region and where $\Delta\tau$ represents an integration range with respect to time from an initial instant to, and means for combining the first and second auxiliary signals to derive the output signal.

2. A device according to claim 1 wherein the means for forming each of the auxiliary signals representing a double integral comprise:

means for storing at regular intervals ($\Delta\tau$) a signal M'(t) corresponding to the sign of an instantaneous value of the input signal V(t) or a signal M(t) corresponding to the sign and amplitude of an instantaneous value of the input signal;

means for forming, in substantially continuous manner, a signal representing the product of the signal stored by the input signal; and means for generating a signal representing the integral of the signal representing the aforementioned product at time intervals Δt in order to form an output signal corresponding to one of the double integrals $R_1$, $R_2$.

3. A device according to claim 1 wherein in order to determine the time constant $\tau_e$ of an autocorrelation function having the form $$\psi(\tau) = \psi_o \exp\left(-\frac{|\tau|}{\tau_e}\right) + K$$

where K=const., the device further comprises means for forming at least a third auxiliary signal corresponding to a double integral $R_3$ having the general form:

$$R_3 = \frac{1}{\Delta t} \int_{t_o}^{t_o + \Delta t} \int_{\tau_f}^{\tau_f + \Delta\tau} V(t)\, V(t + \tau)\, dt\, d\tau$$

* * * * *